(12) United States Patent　　(10) Patent No.: US 8,356,904 B2
Van Doorn　　(45) Date of Patent: Jan. 22, 2013

(54) SYSTEM AND METHOD FOR CREATING ARTIFICIAL ATOMOSPHERE

(75) Inventor: Markus Gerardus Leonardus Maria Van Doorn, 'S-Hertogenbosch (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 899 days.

(21) Appl. No.: 12/096,801

(22) PCT Filed: Dec. 6, 2006

(86) PCT No.: PCT/IB2006/054632
§ 371 (c)(1),
(2), (4) Date: Jun. 10, 2008

(87) PCT Pub. No.: WO2007/069143
PCT Pub. Date: Jun. 21, 2007

(65) Prior Publication Data
US 2008/0265797 A1　　Oct. 30, 2008

(30) Foreign Application Priority Data

Dec. 15, 2005　(EP) .................................... 05112261

(51) Int. Cl.
*G03B 21/20* (2006.01)
(52) U.S. Cl. ................. 353/85; 353/28; 353/30; 353/87; 353/122; 315/362
(58) Field of Classification Search ............ 353/28, 353/30, 31, 85, 87, 119, 122; 348/77, 207.1, 348/207.11, 211.99, 211.2, 715, 716, 718, 348/719, 720, 721; 362/230, 231, 800, 249, 362/543, 544, 545, 494, 293, 490, 135, 497; 315/294, 318, 312, 324, 360, 362, 366, 368.12, 315/368.15; 345/102, 204, 211–214; 382/166, 382/154, 162, 163
See application file for complete search history.

(56) References Cited

U.S. PATENT DOCUMENTS

| | | | | |
|---|---|---|---|---|
| 6,492,782 | B2 * | 12/2002 | Ishizuka | 315/360 |
| 6,493,031 | B1 * | 12/2002 | Washizawa | 348/335 |
| 6,523,976 | B1 * | 2/2003 | Turnbull et al. | 362/231 |
| 6,559,826 | B1 * | 5/2003 | Mendelson et al. | 345/102 |
| 7,273,286 | B2 * | 9/2007 | Ikebe et al. | 353/85 |
| 7,312,780 | B2 * | 12/2007 | Olson et al. | 345/102 |
| 7,390,092 | B2 * | 6/2008 | Belliveau | 353/30 |

(Continued)

FOREIGN PATENT DOCUMENTS

| | | |
|---|---|---|
| WO | WO0105195 A1 | 1/2001 |
| WO | WO02092183 A1 | 11/2002 |

(Continued)

*Primary Examiner* — Georgia Y Epps
*Assistant Examiner* — Sultan Chowdhury
(74) *Attorney, Agent, or Firm* — John F. Salazar; Mark L. Beloborodov

(57) ABSTRACT

A lighting system (100) includes at least one controllable light source (125) configured to provide a light having at least one attribute; an image renderer (135) configured to render at least one image; and a system controller (110) configured to select the image in corresponding to the selected attribute. The system controller (110) may be configured to receive at least one script associated with different light attributes such as different light intensity or brightness levels, and to change the image in response to changes of the light attribute in accordance with the script.

6 Claims, 1 Drawing Sheet

U.S. PATENT DOCUMENTS

| | | |
|---|---|---|
| 7,532,176 B2 * | 5/2009 | Imade .............................. 345/32 |
| 8,243,004 B2 * | 8/2012 | Fergason ...................... 345/102 |
| 2002/0030660 A1 * | 3/2002 | Arakawa ....................... 345/102 |
| 2002/0071277 A1 * | 6/2002 | Starner et al. ................. 362/276 |
| 2002/0194216 A1 | 12/2002 | Kanno et al. |
| 2003/0046693 A1 | 3/2003 | Billmaier et al. |
| 2004/0071365 A1 * | 4/2004 | Zhang et al. ................... 382/284 |
| 2004/0141000 A1 | 7/2004 | Baba et al. |
| 2004/0178750 A1 | 9/2004 | Belliveau |
| 2005/0023996 A1 | 2/2005 | Adamson et al. |
| 2005/0041161 A1 * | 2/2005 | Dowling et al. .............. 348/739 |
| 2005/0083487 A1 | 4/2005 | Hunt et al. |
| 2006/0125928 A1 * | 6/2006 | Wolcott et al. ............. 348/211.2 |

FOREIGN PATENT DOCUMENTS

WO  WO02100548 A2  12/2002

* cited by examiner

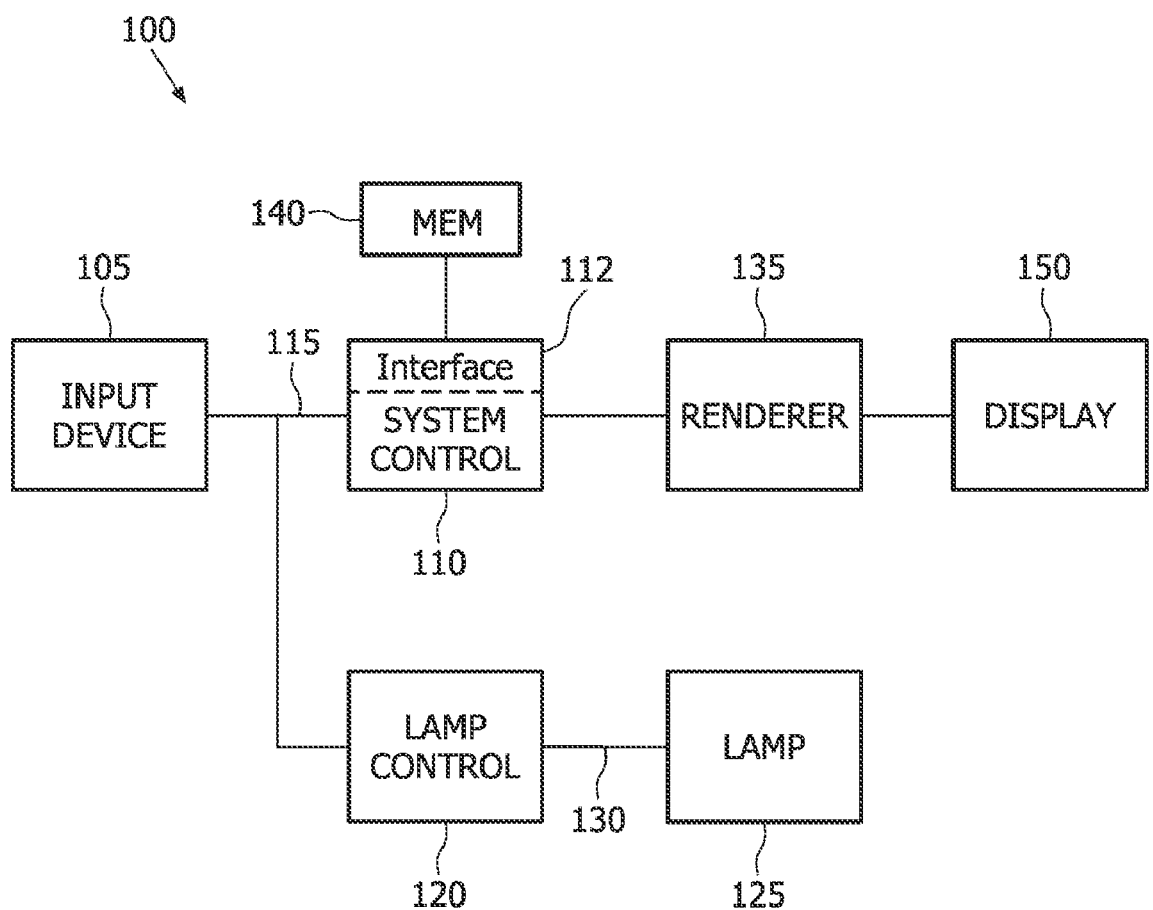

SYSTEM AND METHOD FOR CREATING ARTIFICIAL ATMOSPHERE

The present invention relates to illumination systems and methods, especially to system and methods for creation of an artificial atmosphere in a private room, as well as in public places, such as train and bus stations, airports, airplanes, buses, trains, ships, theaters and other entertainment facilities, and the like.

Since the invention of a lighting bulb by Edison, lighting systems have become irrevocable part of people's daily lives. In the modern society, lighting systems are constantly being developed.

The prior art presents numerous improvements of lighting systems. For example, US Patent Application Publication No. 2005/0041161, which is incorporated herein by reference in its entirety, discloses entertainment (game) based methods and apparatus involving video display and lighting facilities, in which a computer video display is necessary part of the apparatus structure. A screen for use with the lighting system is provided in a manner so as to be able to reflect illumination produced by the lighting system.

Another US Patent Application Publication No. 2005/0023996, which is incorporated herein by reference in its entirety, describes a control system comprising a processor for receiving control signals from at least one input device, computer related program code enabling the processor to generate output signals based on the control signals, an interface associated with the processor, which interface configuring at least one of regulators regulating a number of light devices. It mentions that the system may be used for scene control "e.g. changing the lighting in a great room from a party atmosphere to a showing of the art on the walls", that is dimming the lighting to facilitate the viewing of the art projected on the walls.

Another solution presented by International Publication No. WO 01/05195, which is incorporated herein by reference in its entirety, is dedicated to a system and methods for creation and design of lighting sequences, comprising a processor, a software interface to create a program that may include a number of lighting sequences capable of being executed by a lighting controller, which controls a number of lighting units. The sequence is assembled from objects stored in memory representing lighting effects, or also may include input from analog, digital, manual or another external source, such as a user, sensor, sound level detection device, RF or IR signal, feedback from the lighting system.

The prior art also presents a real world representation system disclosed in International Publication No. WO 02/092183, which is incorporated herein by reference in its entirety, that comprises a set of markup language enabled devices each providing one or more parameters, e.g. audio and visual characteristics. The markup language enabled devices may include different display, lighting, audio, and heating devices; walls and floor provided with display functionality; animatronic, electronic, and robotic equipment; and interactive pictures. At least one of the devices can receive a real-world description in the form of an instruction set of a markup language, and the devices are operated according to the description. The real-world description is communicated to the devices via broadcast signals, a web link, etc. The devices also include a kind of controller, which in WO 02/092183 is called "adjusting means" for adjusting physical parameters of the devices. The devices are furnished by a browser part that allows reading the description. The disclosure teaches that "if the real-world description reads <FOREST>, <SUMMER>, <EVENING> then the browser part . . . interprets this into specific instructions relating to the colour tones and luminance level."

Illumination levels are also known to influence a person's health, emotions and mood. For instance, light therapy is used to enhance mood and relieve depression particularly during times where a person is little exposed to sunlight. Particular wavelength/intensity light sources are typically used. Further, lighting has become essential in interior designs, including homes and commercial building, such retail stores, to provide desired functions and aesthetics, as well as health benefits, such as reducing eyestrain and enhancing moods.

It should be mentioned, that aesthetics are particularly derived from a human's intuitive perception. Therefore, it becomes increasingly important to design artificial illumination systems in such ways that combine desired physical characteristics of lighting with people's perception of daylight often associated with images of the sun, skies, green leaves, and other phenomena of the nature.

In all aforesaid solutions and many others, conventional lighting systems perform their primary function, namely, providing illumination of a certain level, color, and configuration. Many kinds of manual, electronic, and other input devices exist for regulating the degree of illumination.

It is desirable to provide an intuitive way of creation of an artificial atmosphere, and a system for its physical realization. Accordingly, a lighting system is provided for producing an artificial atmosphere, wherein the illumination levels correspond to respective certain images, still or streaming video including audio as desired, such as of the sun, skies, etc. The image(s) are projected or displayed on suitable display means (such as ceiling, floor, walls, monitor screens, and the like) at substantially the same time when a particular illumination level is produced or changed, or simply when a switch/image controller position is changed.

Such a lighting system and method are based on the insight that a better aesthetic and health effect may be created for a user, if certain illumination levels would each correspond to a displayed desirable or desired images, such as an image(s) of the sun, the moon, blue sky, green leaves, flowers, birds, mountains, hills, waterfalls, and other images of the nature, and/or personal or other images chosen or provided by the end-user. It should be understood that image(s) or picture(s) as discussed herein include one or a series of still images/pictures and/or streaming video which may also include audio as desired.

Illustratively, the images of scenes include images of the sun in different coordinate positions within the images preferably with different brightness to reproduce the respective phases of day sunlight, as well as other images of natural phenomena, such as skies, moonlight, green plants, birds, water sources, different kinds of earth landscape, and the like. The images may be stored in memory (hard drive, chips, cards, etc.) in the form of a list of scripts, or in another form.

A suitable input device is provided, for example a rotatable or slideable knob or switch, or any other user interface implemented by hardware, software or firmware, for example, used for alteration of light levels and/or displayed images, including for example, a graphical user interface which may be stand alone, part of, or associated with any type of suitable control device or display such as a computer, personal digital assistant (PDA), remote control. For example, the user interface may be a touch sensitive screen, keyboard, mouse and the like. The lighting/image system is configured to alter the light levels in response to signals from the input device, and to substantially simultaneously display images associated with the selected level, e.g., a selected light level or selected images. For example, images may be selected and controlled by script(s) associated with the light/image levels, wherein a setting a particular light/image level also results in displaying images associated with the particular light/image level in accordance with the script(s). The end-user may select particular script(s) to associate particular images with particular light/image levels (e.g., set by adjusting a position of the rotary or slideable knob set up by the user), so that in response to providing or selecting a light/image level, a desired associated image is displayed.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention. These and other features, aspects, and advantages of the apparatus and methods of the present invention will become better understood from the following description, appended claims, and accompanying drawings where:

FIG. 1 is a schematic diagram of a system for illumination and creation of an artificial atmosphere according to the invention.

The following description of certain exemplary embodiment(s) is merely exemplary in nature and is in no way intended to limit the invention, its application, or uses.

As mentioned, a better aesthetic and health effect may be created for the user(s), if light levels correspond to images desirable to the end-user, which images may be provided by the user or selected by the user from predefined set of images. Scripts are used to associate the images with various light/image levels. The end-user may select different scripts or different images, or may modify scripts and associated images and light/image levels as desired. Illustratively, a high illumination level corresponds to a picture of a sunny day including the shining sun, bright blue sky, and other respective images. An intermediate illumination level increased from a lower level may correspond, for example, to a sunrise, and an increasing of the lighting level is substantially simultaneously or followed by the changing of images or levels thereof, e.g. to a movement of the sun to the midday position where the image of the sun becomes brighter. The intermediate illumination level, if achieved by decreasing the light/image level from a higher level, may correspond for example to a sunset and/or movement of the sun toward a sunset position. A low illumination level may correspond to the evening sky, perhaps with the moonlight on a lake's surface, stars, etc. Of course, a lot of different sets of images may be designed or authored by professional designers and offered to consumers. Of course, the consumer may also supply any desired images and associate the images or their levels with any desired light/image levels.

FIG. 1 illustrates an embodiment of a system 100 for illumination and creation of an artificial atmosphere. The system 100 comprises an input device 105 capable to be controlled by a manual switch, rotatable knob, slider, or any other user interface used for alteration of light/image levels, including for example, a touch sensitive screen, keyboard, mouse and the like, including a microphone, timers and sensors, such a motion sensors to turn the lights on/off, in communication with a system controller 110. Further, the input device 105 may include a graphical user interface, which may be stand alone device associated with the system controller 100 or a display such as a computer, PDA, a remote control device and the like.

In response to user input, or upon detecting a presence in a room or being activated by a timer for example, the input device 105 issues a selection signal 115 indicative of the light/image level selected by the user or the previously set level for example. The selection signal 115 is provided to a lamp controller 120 to select or control the levels and configuration of illumination of light sources or lamps 125 such as lamps in light fixtures.

The selection signal 115 may be used to control various attributes of light emanating from illumination sources 125, as well as to display desired images or image levels by an image renderer 135. The light source(s) 125 may be any type of light source, such as incandescent, fluorescent, high intensity discharge (HID), as well as light emitting diodes (LEDs). The lamp controller 120 may be associated with some or all the light sources 125 for example, and may be any type of controller, such as a ballast for certain types of lamp as is well know in the art. The lamp controller 120 may be part of the input device 105 for example, such as a rotatable or slideable knob configured to change the light intensity level in response to movement of the knob. The lamp controller 120 is configured to issue an illumination signal 130 to control various attributes of the light emitted from the lamp(s) 125, such as intensity, color, hue, saturation and the like, where LEDs are well suited for providing light of different attributes.

In response to the selection signal 115, the lamp controller 120 sends the illumination signal 130 to the lamp 125 for changing light attributes emanating therefrom. For simplicity, light attributes is referred to as the level or intensity of light, but it should be understood that any light attribute may be changed or controlled. Further, when referring to one lamp controller and one lamp, it should be understood, that one lamp controller may control more than one lamp, or several lamp controllers may be used to control several lamps or groups of lamps, where a script is associated with a desired one of the lamp controllers. Of course, different scripts may be associated with different lamp controllers and lamps, so that for example, different images are displayed on different surfaces or displays in accordance to the script associated with a particular lamp controller and associated lamp(s) and or image renderers 135.

The selection signal 115 from the input device 105 is also provided to the system controller 110 which is configured to control at least one rendering device 135, including play-back devices, displays and/or projectors for displaying images on a surface or display device 150. Of course, more than one rendering device 135 may be used instead of a single one, and the images may be downloaded from a storage device, local or remote, though a network, such as a local or wide area network including the internet or intranets. Alternatively, or in addition, the images may be stored on a memory medium, magnetic, solid state, optical or any other type of memory, such as DVD for example.

Substantially simultaneously with activating a level of light/image intensity or other light attributes for example, the system controller 110 controls the rendering device 135 to display images associated with the light level. Scripts may be used that have images associated with different light/image levels, where in response to the user selected light/image level via the input device 105 for example, including a manual switch, microphone, sensors, timers or the like, an image or a group of images associated to the corresponding illumination level is displayed by the rendering device 135. Each image or a group of images may be chosen from the pre-designed set, associated with a predetermined illumination level within the range of said levels of illumination.

A user interface 112 associated with the system controller 110 may be configured to provide the user with a menu of different scripts for selecting one or more scripts, as well as associating the one or more scripts with light/image levels of one or a group of lights 125 and/or rendering devices 135 controlled by one or various lamps controllers 120 and/or the system controller 110. The user interface 112 and/or system controller 110 may also be configured to allow the user to change or reprogram scripts or create new scripts to associate any desired images with any light/image levels. Of course, the user interface 112 may be part of the input device 105 or a stand alone unit including for example, a display which may be touch sensitive, keyboard, mouse, remote control device, PDA, and the like.

As depicted on FIG. 1, the system controller 110 is in communication with a memory 140 storing programs, which may be provided in the form of scripts (or alternatively as downloadable Java applets, or using a different technology, or written in another programming language), wherein each script is associated with a certain image or a group of images. The system controller 110 may have its own memory (e.g., ROM, RAM or the like) to store needed data such as an operating system as is will known in the art. Of course, alternatively or in addition, some scripts may be associated with a sequence of sounds, e.g. the rippling of a water stream, voices of birds, etc. rendered via an audio renderer or via a combined audio/video renderer. The scripts could be stored on appropriate computer chips, cards, on a hard drive as image files conveniently organized using a database or otherwise, or stored on a Website in addition to or instead of being stored in the memory 140. The system controller 110 may be configured to provide the user (e.g., via an associated user interface 112 which may be part of the input device 105 for example or a separate unit,) a program selector and/or modifier so that the user can select, modify or create scripts having images with corresponding light/image levels of corresponding lamps 115.

The illumination signal(s) 130 and selection signal(s) 115 are generated in such a way that each series of illumination signals for establishing a certain level of illumination substantially relates (or are relatable by the user) to a certain kind (or series) of selection signals eventually corresponding to a certain image or image group or levels thereof.

The predetermined or selected script is then interpreted by the system controller 110, and the image (or image group) corresponding to the particular light/image level is rendered by the image renderer 135 and shown to the user via a display device 150, such as a monitor screen or via a projector that projects the image on wall(s), floor, and/or ceiling of the room. The image renderer 135 includes an interface to translate the output of the program executed by the processor or system controller 110 into appropriate display control signals enabling the display device 150 to display or project the images for viewing on the ceiling, floor, walls, or special screens arranged in a private room or in a public place. The displaying is provided substantially simultaneously, for example, with the producing of illumination by the light sources 125 of the desired illumination level entered by the user through the input device 105.

In another embodiment, the selection signal(s) 115, for example, may include a timer signal, associated with the selection signal(s) 115 received from the input device 105, and originated by the user through a timer which may be part of or separate from the input device 105. In response to such a timer signal, the system controller 110, and thus the image renderer 135, may limit the exposition of the current image (image group), or may change the image(s) to another predetermined image (image group), or may act in any desired way. This can be used in a design of a sequence of images which automatically (or upon a user's request) changes for example the position of the sun, the brightness of the sky, the opening and closing of flowers following the movement of the sun, the sounds of birds, different in different phases of the day sunlight, and so on.

In another embodiment, the input device 105 may receive user voice commands from a microphone which may be part of or separate from the input device 105, instead of (or in addition to) activating a rotatable or slideable knob or switch, which then can be synthesized by proper well known converting means, such as voice recognition modules, provided within the input device 105 into computer application commands. Illustratively, the voice commands include "High", "Medium", and "Low".

Alternatively or in addition, the voice commands may be numerical values, such as from one to ten to provide finer gradation of light/image levels, where one is associated with a low illumination level, and ten is associated with a high illumination level, for example. Instead of voice, the input device may be responsive to sound to turn on/off the lights.

Those voice commands may be provided to a voice recognition module, for example, and converted into signals that influence the selection signals 115 and illumination signals 130 for controlling or choosing a level of illumination desired by the user (as described in the command), where the selection signals 115 are further sent for processing to the system controller 110 for control of the renderer 135 for desired/associated image display. The selection signals 115 may also activate the user interface 112 for selection of any desired light level association with any desired image or image intensity levels, or selection and/or modification of scripts by the user, for example, to select images corresponding to the illumination level. One way to accomplish some of these tasks is the use of the aforementioned real world representation system disclosed in International Publication No. WO 02/092183.

The above described embodiments provide a static or dynamic content of the images and lighting sequences. In the case of static content, the content always acts in a predictable manner determined by commands received from the input device 105. Dynamic content of images or their sequences may be provided, making the user experience unpredictable and more exciting. For instance, the system may work in conjunction with a method for generating an XML-based markup language document disclosed in International Publication No WO 03/100548, which is incorporated herein by reference in its entirety. The method provides a dynamic content through collecting active markup language fragments in a pool, accessing the pool, processing the fragments using at least one predetermined factor (time, content, etc.), and generating a dynamic content markup language document.

For establishing such fragments, different entries to the input device 105, such as from the manual switch, microphone (user voice commands), timers and sensors (including the room temperature, the starting illumination degree, etc.) may be transformed by the input device 105 into specific ones of the selection signals 115, further translated by interface means, as described for example in the aforementioned WO 03/100548, coupled with the programs stored in the memory 140, into such fragments associated to specific instance parameters set up by the entries. The fragments are further parsed, pooled, and processed by the system controller 110 according to the above-described method, e.g. having content as the predetermined factor. As a result, the system generates a dynamic content document, further interpreted and rendered by the image renderer 135, and displayed in the form of dynamically changing images by the display device 150. In this way the positions, configurations, colors of images, and the images themselves may be altered "on-the-fly" to produce a vast variety of unrepeatable scenes corresponding to the illumination levels.

It will be understood and appreciated that the user interface 112 and system controller 110 may be a custom single purpose lighting control panel especially designed for this application, or alternatively, the user interface 112 and system controller 110 may be provided in the form of a personal computer that is programmed as needed to perform the desired lighting control logic.

Such scripts or other software, including operating system for the system controller 110 and other data, can of course be embodied in a computer-readable medium, such as an integrated chip, a peripheral device or memory of the or coupled to system controller 110, which may include a dedicated processor for performing in accordance with the present invention, or may be a general-purpose processor wherein only one of many functions operates for performing in accordance with the present invention. The processor may operate utilizing a program portion, multiple program segments, or may be a hardware device utilizing a dedicated or multi-purpose integrated circuit. Each of the above systems utilized for light/image control may be utilized in conjunction with further systems.

The input device 105 need not control the light source(s) 125, and may only control the image renderer(s) 135 through the system controller 110. For example, the input device 105 may be configured to provide on and off conditions and intermediate conditions between the on and off conditions, e.g., by rotating, sliding or picking (such as by pointing using any pointing device, such as a mouse, pointer, finger, using a keyboard, or screen which may be touch sensitive, etc.) a particular position of a hardware, software, or firmware implemented switch.

In response to the selected switch condition, the image renderer (135) is controlled via the system controller 110, for example, to render particular image(s) having particular intensity or brightness levels for example. Illustratively, a first image responsive to the off or low lighting level condition includes a low intensity image, or image(s) having a first scene e.g., a night scene, sunrise, sunset, evening with stars, or an image of a fireplace with smoldering embers; and a second image responsive to the on or high lighting level condition includes a higher intensity image, higher than the low intensity image, or image(s) having a second scene, e.g., a day scene, bright sun, or an image of a fireplace with a roaring fire. A third rendered image (or many intermediate images) may be responsive to one (or many) of the intermediate conditions or positions of the input device (105). The intermediate image(s) has an intermediate intensity between the low and higher intensities, or image(s) having an intermediate scene(s), e.g., the sun at different positions with different intensities, (such as corresponding to different times of day at later times in the day than high intensity but earlier in the day than low intensity, such as dusk, or sunset etc.,) associated with the intermediate positions of the input device (105), or the fireplace image with varying fire intensity, flicker etc.

Of course, instead of dusk or sunset being associated with low intensity, sunrise may be associated therewith, in which case the intermediate intensity(s) and/or scene(s), (e.g., the sun at different positions with different intensities,) correspond to different times of day at earlier times in the day than high intensity but later in the day than low intensity, such as sunrise, etc., associated with the intermediate positions of the input device (105), or the fireplace image with varying fire intensity, flicker etc.

The system controller 110 and input device 105 or atmosphere switch may even be configured to control environmental conditions, such as heat and/or air conditioning to effect environmental changes in correspondence with the light levels selected from the input device 105. Thus for example, when the input device 105 is set to maximum to provide bright light, in addition the displayed associated images of bright sun and/or roaring fire in a fireplace image, the heat system may be turned higher to warm the environment and/or the air conditioning decreased to reduce cooling. Conversely, in addition to changing the displayed images to the night sky, sunrise/sunset, or a fireplace with the remains of burning wood or smothering embers, for example, the heat may be turned lower (and/or air conditioning increased to provide further cooling) in response to lowering the input device 105 to lower levels, such as to provide lower light intensity levels and cooler temperature.

The intermediate scene and/or intensity may depend on the condition prior to the current intermediate condition. For example, a first intermediate image(s) is rendered, and/or the intensity of the intermediate image(s) increases from a lower intensity, when the intermediate condition is achieved by increasing from the low condition (i.e., the low condition (or any condition which is lower than the intermediate condition) is the condition immediately prior to intermediate condition). Similarly, a second intermediate image(s) is rendered, and/or the intensity of the intermediate image(s) decreases from a higher intensity when the intermediate condition is achieved by decreasing from a condition which is higher than the intermediate condition (e.g., when the condition immediately prior to intermediate condition is a higher condition than the intermediate condition).

Finally, the above-discussion is intended to be merely illustrative of the present invention and should not be construed as limiting the appended claims to any particular embodiment or group of embodiments. Thus, while the present invention has been described in particular detail with reference to specific exemplary embodiments thereof, it should also be appreciated that numerous modifications and changes may be made thereto without departing from the broader and intended spirit and scope of the invention as set forth in the claims that follow. The specification and drawings are accordingly to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function; and e) each of the disclosed elements may be comprised of hardware portions (e.g., discrete electronic circuitry), software portions (e.g., computer programming), or any combination thereof.

The invention claimed is:

1. An imaging system comprising:
an input device configured to provide a low condition, a high condition, and intermediate conditions between said low condition and said high condition;
an image renderer configured to select and render images in response to said low, high and intermediate conditions; wherein a low image responsive to said low condition has a low intensity; and a high image responsive to said high condition has a higher intensity image than said low intensity.

2. The imaging system of claim 1, wherein an intermediate image responsive to one of said intermediate conditions has an intermediate intensity between said low and higher intensities.

3. The imaging system of claim 2, wherein said intermediate intensity increases from said low intensity in response to said input device being changed from said low condition to said one of said intermediate conditions, and said intermediate intensity decreases from said higher intensity in response to said input device being changed from said high condition to said one of said intermediate conditions.

4. A control system comprising:
   an input device having a plurality of positions, said plurality of positions including a minimum position and a maximum position; and
   an image renderer configured to select and render different images in response to said plurality of positions;
   wherein a first one of said different images includes a first scene selected and rendered in response to said maximum position, and a second one of said different images includes a second scene selected and rendered in response to said minimum position;
   wherein said first scene is associated with a high intensity, and said second scene is associated with a lower intensity than said high intensity.

5. The control system of claim 4, wherein said input device further includes intermediate positions between said minimum position and said maximum position, said image renderer being further configured to change said different images to correspond to times of day associated with said intermediate positions.

6. The control system of claim 4, further comprising at least one controllable light source configured to provide a light having at least one attribute associated with said plurality of positions.

* * * * *